United States Patent
Jung et al.

(10) Patent No.: US 8,660,550 B2
(45) Date of Patent: Feb. 25, 2014

(54) METHOD AND SYSTEM FOR DETERMINING COMMUNICATION MODE IN A COMMUNICATION SYSTEM

(75) Inventors: Young-Ho Jung, Suwon-si (KR);
Yung-Soo Kim, Seongnam-si (KR);
Myeon-Kyun Cho, Seongnam-si (KR);
Sang-Min Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 736 days.

(21) Appl. No.: 12/124,563

(22) Filed: May 21, 2008

(65) Prior Publication Data
US 2009/0011778 A1 Jan. 8, 2009

(30) Foreign Application Priority Data
Jul. 6, 2007 (KR) .................. 10-2007-0068190

(51) Int. Cl.
*H04M 11/00* (2006.01)
*H04W 88/02* (2009.01)
*H04M 1/725* (2006.01)
*H04W 24/00* (2009.01)

(52) U.S. Cl.
CPC .......... *H04W 88/02* (2013.01); *H04M 1/72516* (2013.01); *H04W 24/00* (2013.01)
USPC .......................................... 455/421; 375/265

(58) Field of Classification Search
USPC ........................................ 455/421; 375/265
See application file for complete search history.

(56) References Cited

U.S. PATENT DOCUMENTS

| 7,532,676 | B2 * | 5/2009 | Fonseka et al. ............... 375/265 |
| 2002/0160770 | A1 | 10/2002 | Suzuki et al. |
| 2004/0127214 | A1 | 7/2004 | Reddy et al. |
| 2006/0193292 | A1 | 8/2006 | Bansal et al. |

FOREIGN PATENT DOCUMENTS

| CN | 1131497 A | 9/1996 |
| CN | 1363153 A | 8/2002 |
| CN | 1527621 A | 9/2004 |
| EP | 1168676 A | 1/2002 |
| JP | 06-085739 A | 3/1994 |
| JP | 2001-230723 A | 8/2001 |
| JP | 2002-084566 A | 3/2002 |
| JP | 2007-037119 A | 2/2007 |
| JP | 2007-158592 A | 6/2007 |
| JP | 2007-165980 A | 6/2007 |

* cited by examiner

*Primary Examiner* — William D Cumming
(74) *Attorney, Agent, or Firm* — Jefferson IP Law, LLP

(57) ABSTRACT

A method and system for determining a communication mode in a communication system are provided. The system and method include determining whether a first MS and a second MS are located within a preset area where P2P communications are available, estimating a first expected performance that can be achieved when the first and second MSs operate in a cellular communication mode, estimating a second expected performance that can be achieved when the first and second MSs operate in a P2P communication mode if the first and second MSs are located within the predetermined area, and selecting one of the cellular communication mode and the P2P communication mode as a communication mode between the first and second MSs by comparing the first expected performance with the second expected performance.

26 Claims, 6 Drawing Sheets

METHOD AND SYSTEM FOR DETERMINING COMMUNICATION MODE IN A COMMUNICATION SYSTEM

PRIORITY

This application claims the benefit under 35 U.S.C. §119(a) of a Korean patent application filed in the Korean Intellectual Property Office on Jul. 6, 2007 and assigned Serial No. 2007-68190, the entire disclosure of which is hereby incorporated by reference.

BACKGROUND OF THE INVENTION

1. Field of the Invention

The present invention generally relates to a method and system for determining a communication mode. More particularly, the present invention relates to a method and system for determining a communication mode between Mobile Stations (MSs).

2. Description of the Related Art

In a communication system, there are, by and large, two communication modes for communicating between a transmitting MS (i.e. a source MS (MS_S)) and a receiving MS (i.e. a destination MS (MS_D)). Those modes are the cellular communication mode and the Peer-to-Peer (P2P) communication mode. In the cellular communication mode, MS_S communicates with MS_D via a Base Station (BS), whereas in the P2P communication mode, MS_S communicates directly with MS_D without the aid of the BS.

With reference to FIG. 1, the conventional cellular communication mode and P2P communication mode will be described below.

FIG. 1 illustrates a cellular communication-mode operation and a P2P communication-mode operation in a conventional communication system.

Referring to FIG. 1, the communication system includes a BS 101, a source MS 103 (MS_S), a first destination MS 105 (MS_D 1), and a second destination MS 107 (MS_D 2).

In the illustrated example of FIG. 1, MS_S communicates with MS_D 2 in the cellular communication mode. The reason MS_S uses the cellular mode is because MS_D 2 is located outside a maximum distance of the signal transmitted by MS_S. The maximum distance, which is known to both MS_S and MS_D 2, is a distance within which it is preferable that MS_S communicates with MS_D 2 using the P2P communication mode. For instance, the maximum distance preset by the communication system may be denoted as d. In the example of FIG. 1, the distance between MS_S and MS_D 2 is greater than d by a distance Δ. Since the total distance between MS_S and MS_D 2 is d+Δ, MS_D 2 is not located within d and MS_S and MS_D 2 use the cellular communication mode. Conversely, since MS_D 1 is located within the distance d, MS_S communicates with MS_D 1 in the P2P communication mode.

However, even though MS_D 1 is within the distance d, if no resources are available for P2P communications between MS_S and MS_D 1, or if an agreement has not been reached between MS_S and MS_D 1 with respect to the P2P communications, MS_S communicates with MS_D 1 using the cellular communication mode.

To facilitate P2P communications between MS_S and MS_D, as described above, a mutual agreement on the P2P communication should be made and preparation for the P2P communications should be completed. The P2P communication preparation amounts to setting MS_S to P2P signal transmission and setting MS_D to P2P signal reception.

Accordingly, when an MS is to communicate with another MS, they must undergo a series of processes each time, including a communication mode selection and a mutual agreement on the communication mode. These processes are time consuming and inconvenient for the MS users. Moreover, even in a situation where the P2P communication mode is preferable, they cannot operate in the P2P communication mode without reaching an agreement on the P2P communication mode.

SUMMARY OF THE INVENTION

An aspect of the present invention is to address at least the above mentioned problems and/or disadvantages and to provide at least the advantages described below. Accordingly, an aspect of the present invention is to provide a method and system for automatically determining a communication mode between MSs and operating the MSs in the determined communication mode without making an agreement on the communication mode between them in a communication system.

In accordance with an aspect of the present invention, a method for determining a communication mode in a communication system is provided. The method includes determining whether a first MS and a second MS are located within a preset area where P2P communications are available, estimating a first expected performance that can be achieved when the first and second MSs operate in a cellular communication mode, estimating a second expected performance that can be achieved when the first and second MSs operate in a P2P communication mode if the first and second MSs are located within the predetermined area and selecting one of the cellular communication mode and the P2P communication mode as a communication mode between the first and second MSs by comparing the first expected performance with the second expected performance.

In accordance with another aspect of the present invention, a system for determining a communication mode in a communication system is provided. The system determines whether a first MS and a second MS are located within a preset area where P2P communications are available, estimates a first expected performance that can be achieved when the first and second MSs operate in a cellular communication mode, estimates a second expected performance that can be achieved when the first and second MSs operate in a P2P communication mode, if the first and second MSs are located within the preset area, and selects one of the cellular communication mode and the P2P communication mode as a communication mode between the first and second MSs by comparing the first expected performance with the second expected performance.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and system for automatically selecting an optimal communication mode between MSs and implementing the selected communication mode between the MSs without the need for making an agreement on the communication mode between the MSs in a communication system.

A description of communication modes for conducting communications between MSs will precede that of the present invention. The communication modes are largely categorized into a cellular communication mode and a P2P communication mode. In the cellular communication mode, a transmitting MS (i.e. MS_S) communicates with a receiving MS (i.e. MS_D) via a BS, whereas in the P2P communication mode, MS_S communicates directly with MS_D without the aid of the BS.

Now a description will be made of an operation for selecting a communication mode for communications with MS_D by MS_S in a communication system according to an exemplary embodiment of the present invention, with reference to FIGS. 2A, 2B and 3.

Figure 1:
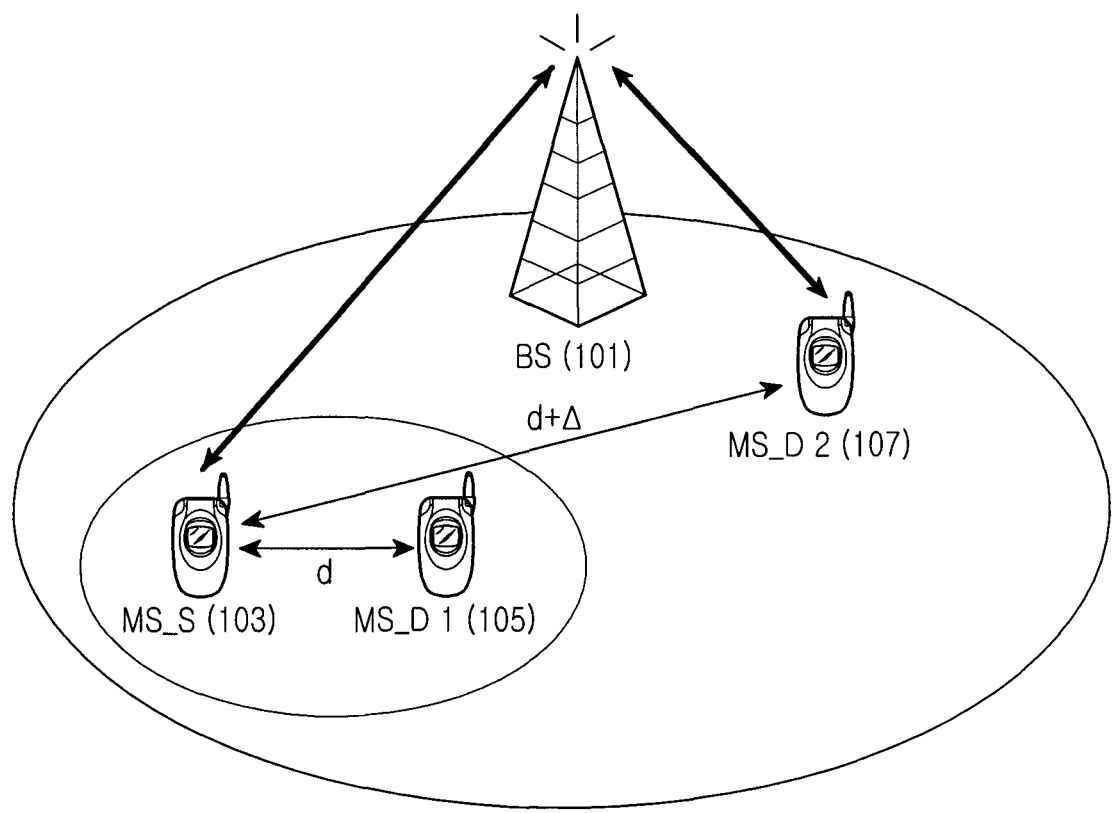
FIG. 1 illustrates a conventional communication system using a cellular communication mode and a P2P communication mode.
Figure 2A:
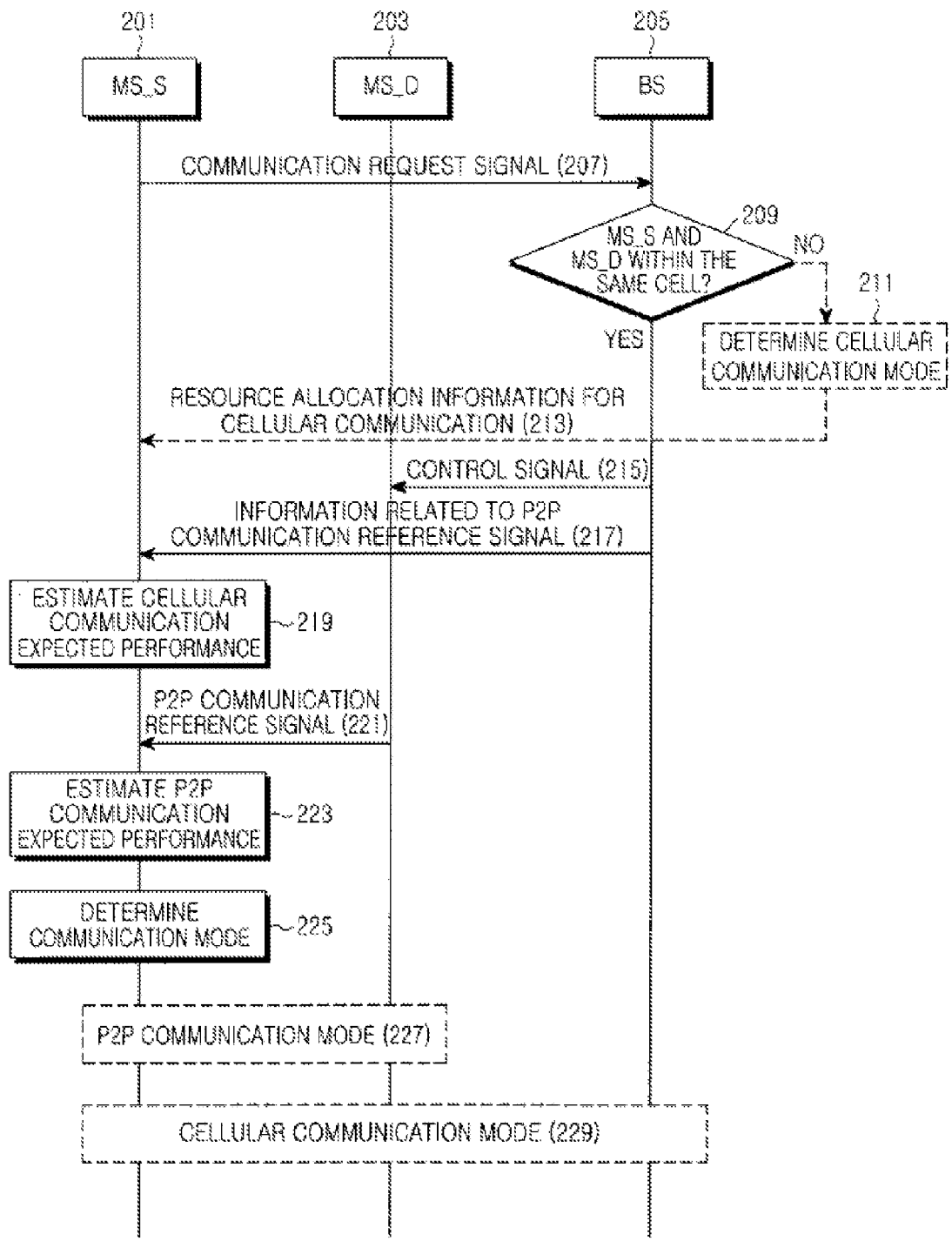
FIG. 2A is a diagram illustrating a signal flow for an operation of determining a communication mode between MS_S and MS_D by MS_S in a communication system according to an exemplary embodiment of the present invention.

FIG. 2A is a diagram illustrating a signal flow for an operation of determining a communication mode between an MS_S and an MS_D by the MS_S in a communication system according to an exemplary embodiment of the present invention.

Referring to FIG. 2A, the communication system includes a source MS (MS_S 201), a destination MS (MS_D 203) and a BS 205.

Upon generation of transmission data directed to MS_D 203, MS_S 201 transmits a communication request signal to the BS 205, requesting communications with MS_D 203 in step 207. The BS 205 determines whether MS_S 201 and MS_D 203 are located within the same cell in step 209. If MS_S 201 and MS_D 203 exist in different cells, the BS 205 selects the cellular communication mode for communications between MS_S 201 and MS_D 203 in step 211 and transmits resource allocation information for operation in the cellular communication mode (i.e. for cellular communications) to MS_S 201 in step 213. In step 229, MS_S 201 operates in the cellular communication mode with respect to MS_D 203 according to the received resource allocation information.

On the other hand, if MS_S 201 and MS_D 203 are within the same cell, the BS 205 transmits a control signal to MS_D 203 in step 215. The control signal instructs the MS_D 203 to transmit a reference signal for operation in the P2P communication mode (i.e. P2P communications) to MS_S 201 using predetermined resources and a predetermined signal pattern at a predetermined time. The BS 205 also transmits to MS_S 201 information related to the P2P communication reference signal, that is, information about the predetermined time, resources, and signal pattern in step 217.

Figure 2B:
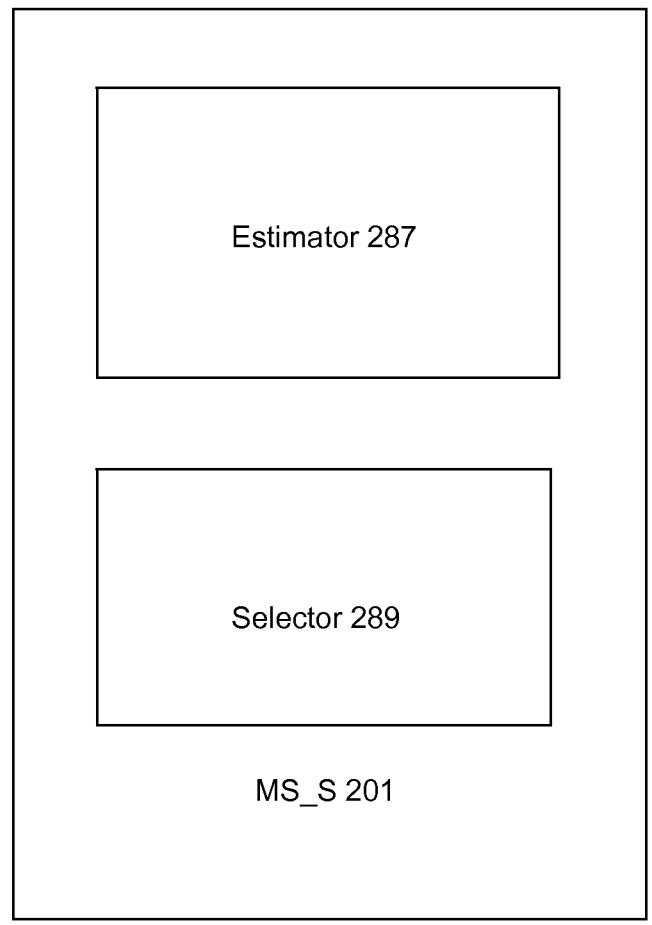
FIG. 2B is a diagram of an MS_S in a communication system according to an exemplary embodiment of the present invention.

Referring to FIG. 2B, MS_S 201 comprises an estimator 287 for estimating an expected performance of cellular communications, as well as estimating an expected performance of P2P communications. MS_201 further comprises a selector 289 for selecting a mode of communication. The operation of these components is described in further detail in the following paragraphs.

In the exemplary implementation of FIG. 2A, MS_S 201 initially has no knowledge of the reference signal-related information required for P2P communications with MS_D 203. Yet, MS_S 201 can acquire the reference signal-related information for P2P communications from broadcast information received from the BS 205. In this case, step 217 is skipped. Also, the BS 205 may not need to transmit information about a fixed value to MS_S 201 in the communication system if the fixed-value information is included in the reference signal-related information (i.e. information about the predetermined time, resources, and signal pattern).

The MS_S 201 receives a reference signal for cellular communications from the BS 205 and estimates, using estimator 287, an expected performance of cellular communications with MS_D 203 (referred to as cellular communication expected performance) in step 219. The cellular communication reference signal can be a preamble signal, a pilot signal, a data signal, or the like. The MS_S 201 estimates an expected performance by at least one of a Quality of Service (QoS) class, a data rate, communication charge rate, transmission/reception power level, communication capacity, a Signal-to-Noise Ratio (SNR), a Frame Error Rate (FER), a Bit Error Rate (BER), and a Symbol Error Rate (SER), for example. While the cellular communication expected performance is estimated in step 219 in the present example, it is to be clearly understood that the estimation can take place at any time before determining a communication mode in step 225.

The MS_D 203 transmits the P2P communication reference signal to MS_S 201 using the predetermined resources and the predetermined signal pattern at the predetermined time in accordance with the control signal received from the BS 205, in step 221. Upon receipt of the P2P communication reference signal, MS_S 201 estimates, using estimator 287, an expected performance of P2P communications (referred to as P2P communication expected performance) using the received signal in step 223. The estimation of the P2P communication expected performance can be considered in at least two ways. One is to estimate the P2P communication expected performance by acquiring synchronization based on the P2P communication reference signal received in step 221 and the reference signal-related information received in step 217, and the other is to estimate the P2P communication expected performance by measuring the signal level of the P2P communication reference signal.

Based on the estimates made in steps 219 and 223, the MS_S decides on a communication mode with respect to MS_D 203 in step 225. In one exemplary implementation, the MS_S 201 makes the decision by subtracting the P2P communication expected performance estimated in step 223 from the cellular communication expected performance estimated in step 219 and comparing the difference with a threshold. The threshold is a real value determined according to characteristics of MSs, a charge system, the number of MSs within the service coverage of a BS, the occupancy of communication resources, a data transmission amount, etc.

More specifically, if the difference is equal to or larger than the threshold, MS_S 201 selects, using selector 289, the cellular communication mode in step 225 and operates in the cellular communication mode with MS_D 203 in step 229. If the difference is below the threshold, MS_S 201 selects the P2P communication mode in step 225 and communicates with MS_D 203 in the P2P communication mode in step 227.

Figure 3:
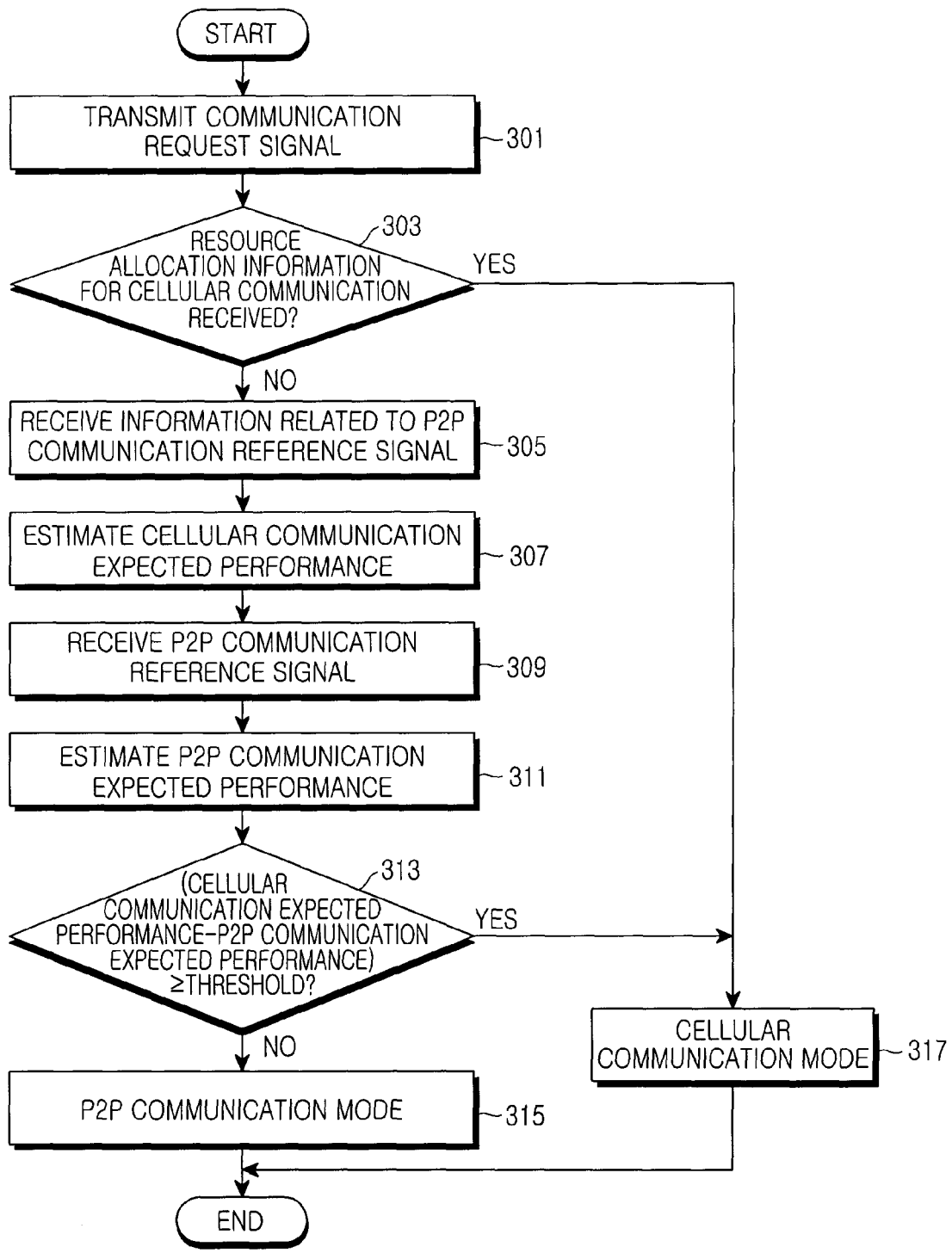
FIG. 3 is a flowchart illustrating an operation of determining a communication mode between MS_S and MS_D by MS_S in a communication system according to an exemplary embodiment of the present invention.

FIG. 3 is a flowchart illustrating an operation for determining a communication mode between an MS_S and an MS_D by the MS_S in a communication system according to an exemplary embodiment of the present invention.

Referring to FIG. 3, upon generation of transmission data directed to MS_D, MS_S transmits a communication request signal to the BS, requesting communications with MS_D in step 301. In step 303, MS_S monitors whether it has received resource allocation information for cellular communications from the BS. If MS_S has received the resource allocation information, MS_S operates in the cellular communication mode with respect to MS_D in step 317. If MS_S has not received the resource allocation information, it receives information related to a P2P communication reference signal from the BS in step 305 and estimates a cellular communication expected performance to determine a communication mode in step 307.

In step 309, MS_S receives a P2P communication reference signal from MS_D. Then, MS_S estimates a P2P communication expected performance in step 311. In an exemplary implementation, MS_S estimates P2P performance by acquiring synchronization based on the P2P communication reference signal and the reference signal-related information or by measuring the signal level of the P2P communication reference signal.

The MS_S compares the difference computed by subtracting the P2P communication expected performance from the cellular communication expected performance with a threshold in step 313. If the difference is equal to or larger than the threshold, MS_S selects the cellular communication mode for communications with MS_D in step 317. If the difference is below the threshold, MS_S operates in the P2P communication mode with MS_D in step 315.

While it has been described above that MS_S decides on a communication mode for communications with MS_D by estimating the cellular communication expected performance and the P2P communication expected performance in the illustrated case of FIG. 3, it is a mere exemplary application. In another exemplary embodiment, MS_S feeds back the cellular communication expected performance and the P2P communication expected performance to the BS and the BS is responsible for determining the communication mode between MS_S and MS_D.

Figure 4:
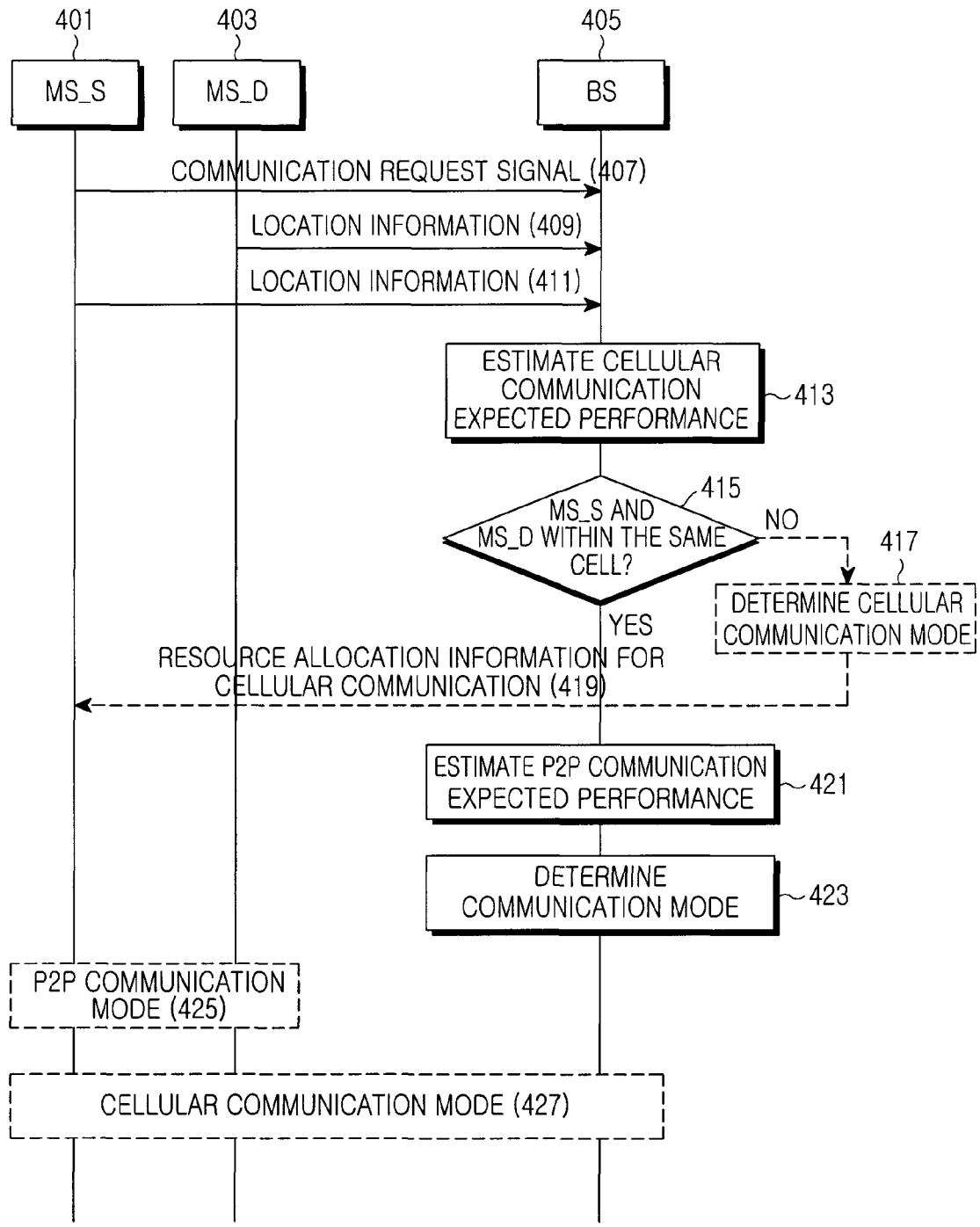
FIG. 4 is a diagram illustrating a signal flow for an operation of determining a communication mode between MSs within the service area of a BS by the BS in a communication system according to an exemplary embodiment of the present invention.
Figure 5:
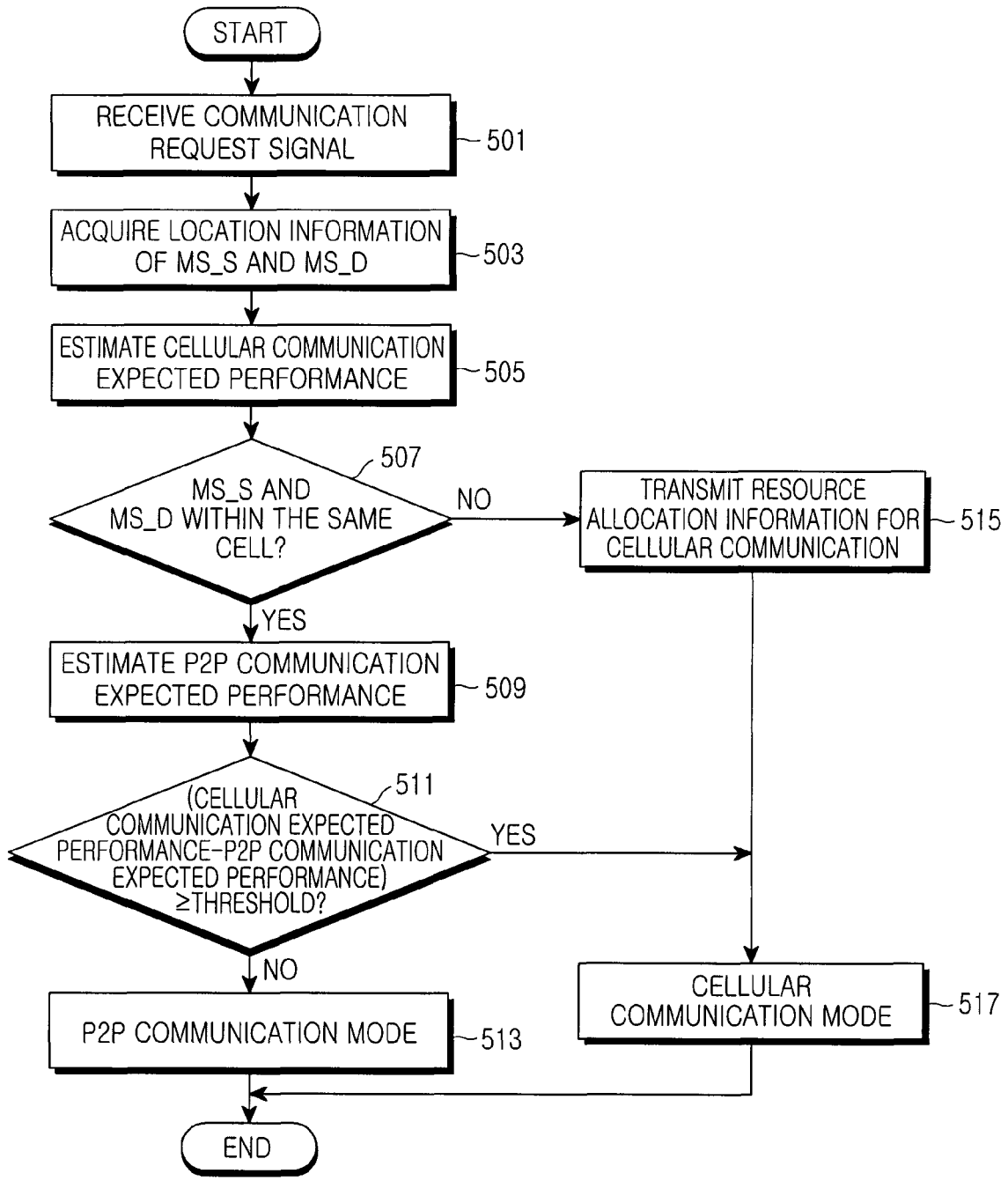
FIG. 5 is a flowchart illustrating an operation for determining a communication mode between MSs within a service area of a BS by the BS in a communication system according to an exemplary embodiment of the present invention.

With reference to FIGS. 4 and 5, an operation of a BS for deciding on a communication mode between MSs within a service area of the BS (i.e. an area covering a distance that a signal from the BS reaches in the communication system) according to an exemplary embodiment of the present invention will be described below.

FIG. 4 is a diagram illustrating a signal flow for an operation of determining a communication mode between MSs within a service area of a BS by the BS in a communication system according to an exemplary embodiment of the present invention.

Referring to FIG. 4, the communication system includes a source MS (MS_S 401), a destination MS (MS_D 403) and a BS 405. For this example, it is assumed that MS_S and MS_D are within the service area of the BS 405.

Upon generation of transmission data directed to MS_D 403, MS_S 401 transmits a communication request signal to the BS 405, requesting communications with MS_D 403 in step 407. MS_S 401 and MS_D 403 locate themselves using a position information acquirer, for example, a Global Positioning System (GPS) and transmit their location information to the BS 405 in steps 409 and 411. In an exemplary implementation, steps 409 and 411 may be skipped depending on a system situation. That is, the locations of MS_S 401 and MS_D 403 may have been previously acquired by the BS 405 or the BS 405 may determine their locations in a different manner. For example, the BS 405 may determine the location information by estimating the angles of MS_S 401 and MS_D 403, the strengths of ranging signals from MS_S 401 and MS_D 403 and the distance between MS_S 401 and MS_D 403.

The BS 405 estimates a cellular communication expected performance based on the received location information of MS_S 401 and MS_D 403 in step 413 and determines whether MS_S 401 and MS_D 403 are within a preset area in step 415. While the preset area is depicted as the same cell in the exemplary embodiment of the present invention for illustrative purposes, it can also be the service areas of neighbor BSs, namely, neighbor cell areas. In addition, while the cellular communication expected performance is estimated in step 413 in the illustrated example, it is to be clearly understood that the estimation can take place at any time before determining a communication mode, here illustrated in step 423.

If MS_S 401 and MS_D 403 are in different cells, the BS 405 decides on the cellular communication mode as the communication mode between MS_S 401 and MS_D 403 in step 417 and transmits resource allocation information for cellular communications to MS_S 401 in step 419. Thus, MS_S 401 operates in the cellular communication mode based on the resource allocation information in step 427.

On the contrary, if MS_S 401 and MS_D 403 are in the same cell, the BS 405 estimates a P2P communication expected performance using the information about the distance between MS_S 401 and MS_D 403 computed based on the location information received in steps 409 and 411 or otherwise determined, in step 421. Then the BS 405 compares the difference computed by subtracting the P2P communication expected performance from the cellular communication expected performance with a threshold and decides on a communication mode between MS_S 401 and MS_D 403 in step 423. To be more specific, if the difference is equal to or larger than the threshold, the BS 405 selects the cellular communication mode in step 423 and MS_S 401 communicates with MS_D 403 in the cellular communication mode in step 427. If the difference is below the threshold, the BS 405 selects the P2P communication mode in step 423 and MS_S 401 communicates with MS_D 403 in the P2P communication mode in step 425.

FIG. 5 is a flowchart illustrating an operation for determining a communication mode between MSs within a service area of a BS by the BS in a communication system according to an exemplary embodiment of the present invention.

Referring to FIG. 5, the BS receives a communication request signal requesting communications with MS_D from MS_S in step 501. In step 503, the BS receives location information from MS_S and MS_D, or otherwise acquires the location information by estimating the distance between MS_S and MS_D. In step 505, the BS estimates a cellular communication expected performance based on the location information of MS_S and MS_D.

The BS determines whether MS_S and MS_D are within the same cell in step 507. If MS_S and MS_D are in different cells, the BS transmits resource allocation information for cellular communications to MS_S in step 515 and operates in the cellular communication mode in step 517.

On the contrary, if MS_S and MS_D are in the same cell, the BS estimates a P2P communication expected performance using the information about the distance between MS_S and MS_D in step 509. Then the BS compares the difference computed by subtracting the P2P communication expected performance from the cellular communication expected performance with a threshold in step 511. If the difference is below the threshold, the BS operates in the P2P communication mode in step 513. If the difference is equal to or larger than the threshold, the BS operates in the cellular communication mode in step 517.

As is apparent from the above description, exemplary embodiments of the present invention automatically determine an optimal communication mode between MSs and operate the MSs in the optimal communication mode without making an agreement on the optimal communication mode between the MSs in a communication system. Therefore, a user can receive a more efficient communication service.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for determining a communication mode in a communication system, the method comprising:
   estimating, by a first Mobile Station (MS), a first expected performance when the first MS and a second MS operate in a cellular communication mode;
   estimating, by the first MS, a second expected performance when the first and second MSs operate in a P2P communication mode, if the first and second MSs are located within a preset area where Peer-to-Peer (P2P) communications are available; and
   selecting, by the first MS, one of the cellular communication mode and the P2P communication mode as a communication mode between the first and second MSs by comparing the first expected performance with the second expected performance.

2. The method of claim 1, wherein the first expected performance and the second expected performance are determined by at least one of a Quality of Service (QoS) class, a data rate, a communication charge rate, a transmission/reception power level, a communication capacity, a Signal-to-Noise Ratio (SNR), a Frame Error Rate (FER), a Bit Error Rate (BER) and a Symbol Error Rate (SER).

3. The method of claim 1, wherein the estimating of the first expected performance comprises estimating the first expected performance using at least one of a preamble signal, a pilot signal and a data signal.

4. The method of claim 1, wherein the estimating of the second expected performance comprises:
   receiving reference signal-related information from a Base Station (BS), the reference signal-related information including information about a predetermined time, predetermined resources and a predetermined signal pattern;
   receiving a reference signal in the predetermined resources and the predetermined signal pattern at the predetermined time from the second MS; and
   estimating the second expected performance by acquiring synchronization based on the reference signal-related information and the received reference signal.

5. The method of claim 1, wherein the estimating of the second expected performance comprises:
   receiving a reference signal in predetermined resources and a predetermined signal pattern at a predetermined time from the second MS; and
   estimating the second expected performance by measuring a signal level of the reference signal.

6. The method of claim 1, wherein the selecting of one of the cellular communication mode and the P2P communication mode comprises:
   calculating a difference by subtracting the second expected performance from the first expected performance; and
   selecting the cellular communication mode as the communication mode between the first and second MSs, if the difference is equal to or larger than a threshold.

7. The method of claim 1, wherein the selecting of one of the cellular communication mode and the P2P communication mode comprises:
   calculating a difference by subtracting the second expected performance from the first expected performance; and
   selecting the P2P communication mode as the communication mode between the first and second MSs, if the difference is less than a threshold.

8. The method of claim 6, wherein the threshold comprises a real value determined based on at least one of characteristics of MSs, a charge system, the number of MSs within the service coverage of the BS, an occupancy of communication resources and a data transmission amount.

9. The method of claim 7, wherein the threshold comprises a real value determined based on at least one of characteristics of MSs, a charge system, the number of MSs within the service coverage of the BS, an occupancy of communication resources and a data transmission amount.

10. The method of claim 1, wherein the preset area includes at least one of a cell of the BS and a neighbor cell.

11. The method of claim 1, further comprising transmitting resource allocation information for operation in the cellular communication mode to the first MS, if the first MS and the second MS are not located within the preset area and the cellular communication mode is selected as the communication mode between the first and second MSs.

12. The method of claim 1, further comprising feeding back the first expected performance and the second expected performance to a Base Station (BS).

13. A Mobile Station (MS) for determining a communication mode in a communication system, the MS comprising:

an estimator configured to estimate a first expected performance when the MS and a peer MS operate in a cellular communication mode; and to estimate a second expected performance when the MS and the peer MS operate in a P2P communication mode, if the MS and the peer MS are located within a preset area where Peer-to-Peer (P2P) communications are available; and a selector configured to select one of the cellular communication mode and the P2P communication mode as a communication mode between the MS and the peer MS by comparing the first expected performance with the second expected performance.

14. The MS of claim 13, wherein the first expected performance and the second expected performance are determined by at least one of a Quality of Service (QoS) class, a data rate, a communication charge rate, a transmission/reception power level, a communication capacity, a Signal-to-Noise Ratio (SNR), a Frame Error Rate (FER), a Bit Error Rate (BER) and a Symbol Error Rate (SER).

15. The MS of claim 13, wherein the MS estimates the first expected performance using at least one of a preamble signal, a pilot signal and a data signal.

16. The MS of claim 13, wherein the MS receives reference signal-related information from a Base Station (BS), the reference signal-related information including information about a predetermined time, predetermined resources, and a predetermined signal pattern, receives a reference signal in the predetermined resources and the predetermined signal pattern at the predetermined time from the peer MS, and estimates the second expected performance by acquiring synchronization based on the reference signal-related information and the received reference signal.

17. The MS of claim 13, wherein the MS receives a reference signal in predetermined resources and a predetermined signal pattern at a predetermined time from the peer MS, and estimates the second expected performance by measuring a signal level of the reference signal.

18. The MS of claim 13, wherein a difference is calculated by subtracting the second expected performance from the first expected performance, and the cellular communication mode is selected as the communication mode between the MS and the peer MS, if the difference is equal to or larger than a threshold.

19. The MS of claim 13, wherein a difference is calculated by subtracting the second expected performance from the first expected performance, and the P2P communication mode is selected as the communication mode between the MS and the peer MS, if the difference is less than a threshold.

20. The MS of claim 18, wherein the threshold comprises a real value determined based on at least one of characteristics of MSs, a charge system, the number of MSs within the service of a Base Station (BS), an occupancy of communication resources and a data transmission amount.

21. The MS of claim 19, wherein the threshold comprises a real value determined based on at least one of characteristics of MSs, a charge system, the number of MSs within the service of a Base Station (BS), an occupancy of communication resources and a data transmission amount.

22. The MS of claim 13, wherein the preset area includes at least one of a cell of a Base Station (BS) and a neighbor cell.

23. The MS of claim 13, wherein if the MS and the peer MS are not located within the preset area, the cellular communication mode is selected as the communication mode between the MS and the peer MS.

24. The MS of claim 13, wherein the MS feeds back the first expected performance and the second expected performance to a Base Station (BS).

25. A method for determining a communication mode in a communication system, the method comprising:
    determining, by a Base Station (BS), whether a first Mobile Station (MS) and a second MS are located within a preset area where Peer-to-Peer (P2P) communications are available;
    estimating, by the BS, a first expected performance when the first and second MSs operate in a cellular communication mode;
    estimating, by the BS, a second expected performance when the first and second MSs operate in a P2P communication mode, if the first and second MSs are located within the preset area; and
    selecting, by the BS, one of the cellular communication mode and the P2P communication mode as a communication mode between the first and second MSs by comparing the first expected performance with the second expected performance.

26. The method of claim 25, further comprising acquiring location information about the first MS and location information about the second MS by the BS, wherein at least one of the first expected performance and the second expected performance estimated according to information about a distance between the first MS and the second MS, the information about the distance between the first MS and the second MS being calculated based on the location information about the first and second MSs.

* * * * *